United States Patent
Hayashi

(10) Patent No.: US 7,464,002 B2
(45) Date of Patent: *Dec. 9, 2008

(54) DIAGNOSIS METHOD FOR BOILER DEGRADATION, DIAGNOSIS APPARATUS FOR BOILER DEGRADATION, DIAGNOSIS SYSTEM FOR BOILER DEGRADATION AND RECORDING MEDIUM THAT RECORDS OPERATION PROGRAM

(75) Inventor: Yoshiharu Hayashi, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/826,619

(22) Filed: Jul. 17, 2007

(65) Prior Publication Data
US 2007/0260426 A1 Nov. 8, 2007

Related U.S. Application Data

(63) Continuation of application No. 11/147,438, filed on Jun. 8, 2005, now Pat. No. 7,260,502.

(51) Int. Cl.
*G06F 3/01* (2006.01)

(52) U.S. Cl. ............... 702/183; 702/130; 702/136; 702/182

(58) Field of Classification Search ........ 702/22, 702/24, 84, 181–183, 185, 186, 188, 130, 702/136; 415/118; 422/198; 429/20
See application file for complete search history.

(56) References Cited

U.S. PATENT DOCUMENTS

| | | | |
|---|---|---|---|
| 5,790,420 A * | 8/1998 | Lang | 700/287 |
| 6,522,994 B1 * | 2/2003 | Lang | 702/183 |
| 6,715,914 B1 * | 4/2004 | Fesmire et al. | 374/45 |
| 6,890,673 B2 * | 5/2005 | Higashiyama et al. | 429/20 |
| 7,260,502 B2 * | 8/2007 | Hayashi | 702/183 |
| 2005/0013753 A1 | 1/2005 | Eaton et al. | |
| 2006/0056959 A1 | 3/2006 | Sabol et al. | |

FOREIGN PATENT DOCUMENTS

JP          5-280703          10/1993

* cited by examiner

*Primary Examiner*—Eliseo Ramos-Feliciano
*Assistant Examiner*—Felix Suarez
(74) *Attorney, Agent, or Firm*—Dickstein Shapiro LLP

(57) ABSTRACT

One of the thermal transmission rates that represent thermal transmission from gas to steam in a heat exchanger constituting a boiler is calculated based on thermal conductivity rate of pipes and thermal transfer of steam and gas, and the other is compared with the thermal conductivity rate calculated based on the thermal conductivity rate of the pipes and thermal transfer rate of steam and gas.

3 Claims, 5 Drawing Sheets

FIG. 7

| | VERTICAL LENGTH OF GAS TOWER (mm) | LATERAL LENGTH OF GAS TOWER (mm) | THE NUMBER OF PIPES / ROW (-) | THE NUMBER OF LINES (-) | OUTER DIAMETER OF PIPE (mm) | INNER DIAMETER OF PIPE (mm) | HEIGHT OF FIN (mm) | THICK-NESS OF FIN (mm) | ... |
|---|---|---|---|---|---|---|---|---|---|
| LOW PRESSURE ECONOMIZER | 6000 | 4000 | 50 | 3 | 31.8 | 28.6 | 15.8 | 1.2 | ... |
| LOW PRESSURE EVAPORATOR | 6000 | 4000 | 50 | 10 | 38.1 | 34.9 | 12.7 | 1.2 | ... |
| HIGH PRESSURE ECONOMIZER | ... | | | | | | | | |
| HIGH PRESSURE EVAPORATOR | | | | | | | | | |
| HIGH PRESSURE SUPER-HEATER | | | | | | | | | |

DIAGNOSIS METHOD FOR BOILER DEGRADATION, DIAGNOSIS APPARATUS FOR BOILER DEGRADATION, DIAGNOSIS SYSTEM FOR BOILER DEGRADATION AND RECORDING MEDIUM THAT RECORDS OPERATION PROGRAM

CROSS REFERENCE TO RELATED APPLICATIONS AND CLAIM FOR PRIORITY

The present application is a continuation of U.S. application Ser. No. 11/147,438, filed Jun. 8, 2005, now U.S. Pat. No. 7,260,502 which claims priority from Japanese application Serial No. 2004-189095, filed on Jun. 28, 2004, the entire contents of each of these applications being incorporated herein by reference in their entirety.

FIELD OF THE INVENTION

The present invention relates to a diagnosis method of degradation of a boiler and a diagnosis system therefor. More particularly, the present invention relates to a diagnosis method of boiler degradation comprising presuming an amount of gas flowing through the boiler and gas temperatures of respective heat exchangers, which are difficult to measure at high accuracy, based on measured values of the boiler and a system suitable for practicing the diagnosis method.

RELATED ART

Boilers in a thermal power plant produce steam by high temperature combustion gas upon combustion of coal or petroleum, etc; the steam drives a steam turbine to generate electricity. In a heat recovery boiler constituting a combined cycle power plant, high temperature exhaust gas discharged from a gas turbine that drives a generator for generating electricity produces steam to drive a steam turbine for generating electricity.

If a decrease in performance of the boiler that constitutes the power plant occurs, more fuel than the normal state is consumed so as to keep a certain quantity of electricity constant. As the lowering of the generation efficiency, a fuel cost will increase and electric power companies may receive economical loss.

Under these circumstances, using various sensors disposed to the boiler, information on the boiler characteristics are collected and the boiler should be monitored based on the information. Particularly, there is a main phenomenon that lowers the performance of the boiler, wherein pipes constituting a heat exchanger are stained so that thermal transfer from gas flowing through outside of the pipes to steam flowing through inside of the pipes lowers. Lowering of the thermal transfer due to stain gradually occurs as an operation time goes on; a long-term tendency should be monitored by a monitoring diagnosis system to detect lowering of the performance, which is considered to be useful.

In considering that the thermal plant is operated under constant operation conditions, status amounts (temperature, pressure, flow rate) of produced steam should be kept constant as a matter of course. It is enough to judge whether the status amounts of steam per a unit fuel flow rate is constant or not so as to monitor the performance of the boiler. However, since the thermal power plant is generally operated under a variable load (generation load), the status amounts of steam produced per the unit fuel flow rate change in accordance with the operating conditions. That is, a judging means is useful for easily judging the decrease in the performance of the boiler is caused by the change of the operation conditions or by the degradation such as stain of the pipes of the boiler, which needs a countermeasure for improving the performance.

In order to meet the demands, Japanese patent laid-open No. 05-280703 (Patent document No. 1) discloses a technology wherein a coefficient of overall heat transmission rate (thermal transmission rate) is calculated from a presumed value of gas temperature in respective heat exchangers constituting the boiler; a coefficient of overall heat transmission is separately calculated from empirical values of water and steam; a ratio of the coefficients of overall heat transmission, which is defined as a stain parameter, is monitored to judge the degradation of the boiler due to stain. By introducing the two parameters of the theoretical value and the empirical value into the degradation judgment, judgment of degradation can be easily done even if operation conditions are changed.

Further, in the above technology, though the stain parameters are calculated as the parameters for the respective heat exchangers constituting the boiler, gas temperatures of the respective heat exchangers are necessary to calculate them. High temperature gas flowing through the boiler carries heat transfer to steam (water) at each of the heat exchangers; the heat exchangers that are located at a lower gas stream have a lower gas temperature.

In the case of the normal boiler, gas temperature sensors are not disposed to the respective heat exchangers. Thus, the gas temperature measured at the heat exchanger located at the lowermost flow stream is used to presume the gas temperature of the heat exchanger located at the uppermost flow stream.

(Patent document No. 1) Japanese patent laid-open 05-280703

SUMMARY OF THE INVENTION

However, since the theoretical value of the coefficient of overall heat transmission is calculated from the gas side and the empirical value is calculated from the steam (water) side respectively, it was impossible to evaluate precisely the theoretical value and the empirical value of the coefficients of overall heat transmission.

An object of the present invention is to provide a diagnosis technology for degradation of a boiler, which is capable of precisely evaluating the theoretical value and the empirical value of the coefficients of overall heat transmission rate.

The present invention is featured in that one of the thermal transmission rates from gas to steam in heat exchangers constituting the boiler is calculated, based upon thermal conductivity of the pipes and the thermal transfers of steam and gas, and another thermal transmission rates is compared with thermal transmission rate calculated based upon thermal conductivity of the pipes, and thermal transfers of steam and gas.

It is possible to conduct diagnosis of degradation of boilers at high accuracy.

BRIEF DESCRIPTION OF DRAWINGS

FIG. 7 is an example of constitution of data stored in design database.

Figure 1:
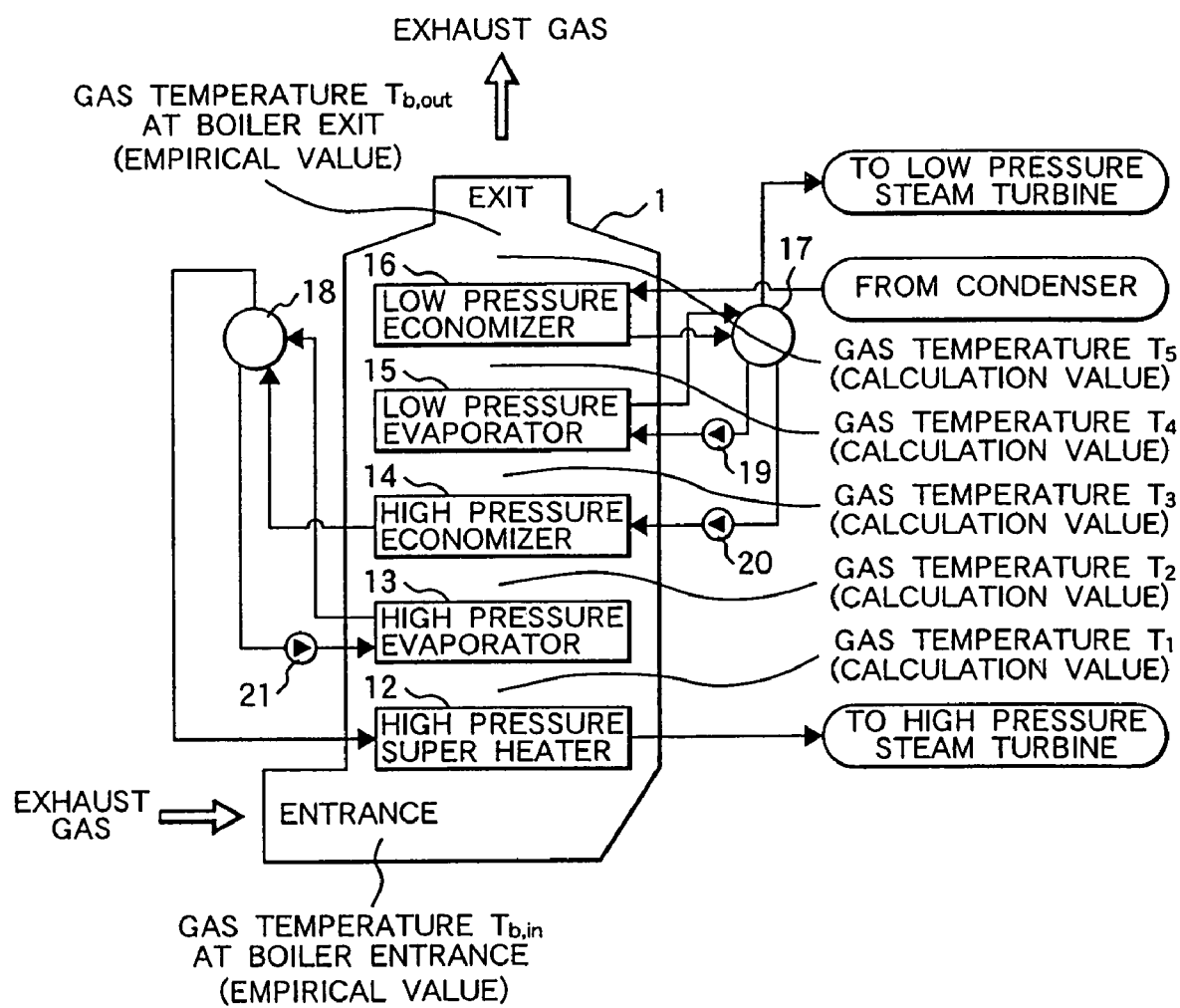
FIG. 1 is a constitution of a heat recovery boiler to be monitored.

EXPLANATION OF REFERENCE NUMERALS 1, 41; heat recovery boiler, 12; high pressure super heater, 13; high pressure evaporator, 14; high pressure economizer, 15; low pressure evaporator, 16; low pressure economizer, 17; low pressure steam dram, 18; high pressure steam dram, 42; calculation section, 43; display device

DETAILED DESCRIPTION OF PREFERRED EMBODIMENTS

In the following, the embodiments of the present invention will be explained by reference to the drawings.

FIG. 1 is a diagrammatic view of a heat recovery boiler to which the degradation diagnosis of the present invention is applied. The heat recovery boiler 1 is used as a component for a combined cycle (C/C) together with a gas turbine and a steam turbine. The high temperature exhaust gas discharged from the gas turbine is taken into the heat recovery boiler from the entrance of the boiler shown in the figure, and it is discharged through the respective heat exchangers from the exit into the atmosphere. The heat exchangers constituting the heat recovery boiler comprises, from the uppermost stream, a high pressure super heater 12, a high pressure evaporator 13, a high pressure economizer 14, a low pressure evaporator 15 and a low pressure economizer 16. The respective heat exchangers comprise plural pipes through which steam passes.

Gas flowing the boiler transfers heat to steam through the pipes in the respective heat exchangers; thus the gas temperature gradually lowers. On the other hand, steam in the pipes elevates its temperature by virtue of heat transfer from gas to steam. A diameter of the pipes and the number of the pipes of the heat exchangers may be different on boilers so as to convert heat energy of gas to steam with high efficiency.

Next, the flow of the steam (water) in the heat recovery boiler 1 is explained. In the C/C plant, water stored in a condenser located at a position after the steam turbine is pumped up to supply it the heat recovery boiler 1. The water from the condenser is taken into the low pressure economizer 16 of the heat recovery boiler at first. Then, water heated by the low pressure economizer 16 is sent to a low pressure steam dram 17 where water stored in the lower part is sent by the pump 19 to the low pressure evaporator 15 where water is boiled in the pipes by heating with gas to effect phase change from water to steam.

Steam generated in the low pressure evaporator 15 flows from the upper part of the low pressure steam dram 17 into the low pressure steam turbine thereby to utilize it as a rotating driving force for the steam turbine. Further, a part of water stored in the lower part of the low pressure steam dram 17 is sent to the high pressure economizer 14 by the pump 20. After it is heated with gas, it is sent to the high pressure steam dram 18 by a pump 21. Water stored in the lower part of the high pressure steam dram 18 is, as the same as water in the low pressure steam dram, sent to the high pressure evaporator 13 by the pump 21, thereby to be evaporated. Steam generated in the high pressure evaporator 13 is sent to the high pressure super heater from the upper part of the high pressure steam dram 18 by the pump 21. High temperature/high pressure steam generated in the high pressure super heater is sent to the high pressure steam turbine.

The above description relates to the flow of processing steam in the heat recovery boiler 1 with an exhaust gas from the gas turbine.

The heat recovery boiler 1 is provided with sensors to detect temperatures, pressures and flow rates of all flow passages of the steam side. In this case, sensors may be disposed at such positions that depending on the flow passages, a flow rate may be calculated by a mass balance or a pressure is evaluated based on a measured value at a remote point to presume a pressure loss.

On the other hand, at a gas side, a pressure and temperature are generally measured only at entrance and exit points of the boiler. Since the difference in pressure between the entrance and the exit is not large so much, it is possible to presume the gas pressure at the respective heat exchangers with high accuracy, based upon the design values on the pressure loss. However, since gas temperature between the boiler entrance and the exit greatly changes by virtue of heat transfer from gas to steam in the respective heat exchangers, the gas temperature of the respective heat exchangers is presumed, depending upon a method of thermal balance between steam and gas of the respective heat exchangers.

Though the gas temperature and gas pressure are measured at the entrance and exit of the boiler, a gas flow rate is not measure in the boiler; if measured, a measured value at a wide area position such as the boiler entrance has low accuracy, which is not useful for boiler diagnosis that needs a high accuracy. Therefore, the gas flow rate of gas flowing in the boiler is evaluated based on an empirical value or design value of the gas turbine, in general.

A gas turbine is constituted by a compressor, a combustor and an expander. Air entering from the compressor is mixed with fuel to combust the mixture at the combustor; it flows through the expander and is discharged as an exhaust gas. Therefore, the gas flow rate is determined as a sum of a flow rate of air entering the compressor and a fuel flow rate entering the combustor. The air flow rate of the value is evaluated by a conversion equation from the empirical value by the pressure sensor and the temperature sensor.

There may be gas turbines having no pressure sensors at the entrance of the compressor depending on types of gas turbines, in such cases, the air-flow rate is calculated based upon design information on the compressor performance, using empirical values of temperature, rotating number and opening degree of a guide vane. However, in this method, since the air flow rate is calculated under the presumption that the compressor is normal, the calculated value and empirical value of the air flow rate may be separated, if the compressor doe not exhibit its designed performance because of the degradation of the compressor.

In case where the air flow rate is calculated using a pressure sensor disposed at the entrance of the compressor, the calculation value and the empirical value may be separated if a leak occurs in the gas turbine.

As described above, the gas flow rate obtained based upon the measured value of the gas turbine side or the design value receives influence of the degradation of gas turbine. That is, if boiler diagnosis is conducted by a method of presumption of the gas flow rate based upon the design values of the gas turbine, which are described above, the results may be affected in such a case that only the gas turbine is degraded, but the boiler has no problem. Therefore, it is difficult to judge which one is degraded.

Because of the above problems, the present invention presumes the gas flow rate based upon empirical values measured by the sensors disposed to the boiler in accordance with the following method, whereby the influence by the degradation of the gas turbine is eliminated to thereby conduct diagnosis of the boiler.

Figure 2:
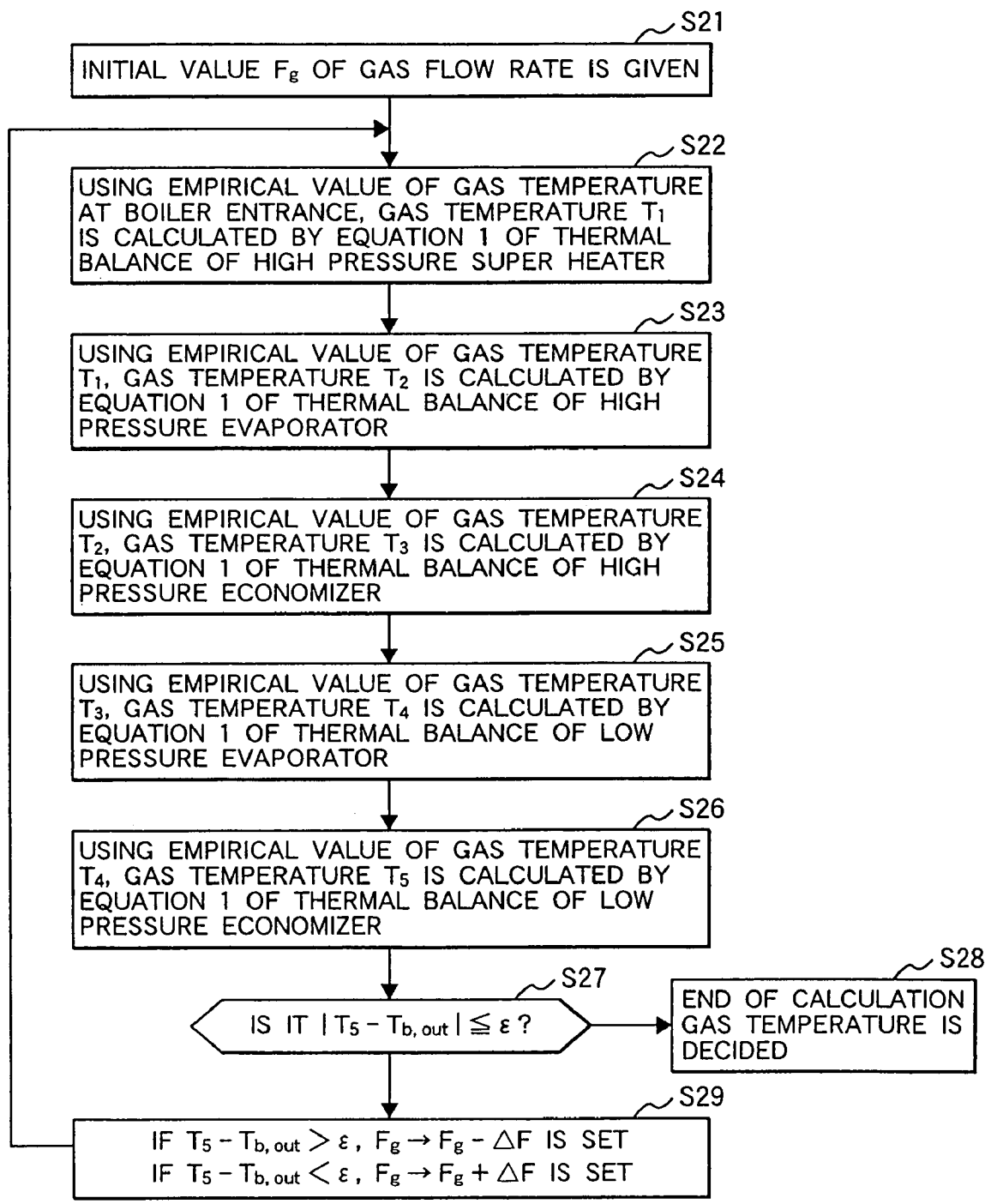
FIG. 2 is a flow of processing for presuming a gas flow rate

FIG. 2 shows a flow of a process for calculating the gas flow rate. In this processing, an initial value of gas flow rate is set at first (S21) so as to do convergent calculation of the gas flow rate. The initial value may be an optional one; from the viewpoint of the stability of the convergent calculation, a preferable initial value should be selected from ones evaluated based upon the empirical value and the design value of the gas turbine.

Next, using the empirical value $T_{b,in}$ of the gas temperature of the boiler entrance shown in FIG. 1, the gas temperature ($T_1$ in the drawing) at the exit of the high pressure super heater (S22). There is shown an equation (1) expressing the thermal balance between gas and steam.

$$F_w \cdot (H_{w,out} - H_{w,in}) = F_g \cdot (H_{g,in} - H_{g,out}) \tag{1}$$

In the equation (1), $F_w$ is a flow rate (kg/s) of steam (water) flowing through the heat exchanger; $H_{w,out}$ enthalpy (J/kg) of steam at the exit; $H_{w,in}$ an enthalpy (J/kg) at the entrance; $F_g$ gas flow rate (kg/s); $H_{g,in}$ an enthalpy (J/kg) of gas at the entrance; and $H_{g,out}$ an enthalpy (J/kg) of gas at the exit.

In the equation, the left side is a thermal energy difference in the gas side between the entrance and the exit, i.e. a reduction width of thermal energy of gas due to transfer of energy to steam. On the other hand, the right side of the equation represents an increase width of thermal energy of steam.

If an energy loss by irradiation to the outside of the boiler is neglected, a change width of energy of gas and steam should be equal in the static characteristics. This relationship can be applied to all heat exchangers. Since the enthalpies in the equation cannot be directly measured, they are used after conversion of pressure and temperature to enthalpies based upon the physical characteristics table.

The increase in the thermal energy at the steam side (left side) in the equation (1) is calculated by substituting a steam flow rate in the high pressure super heater for $F_w$, and substituting a steam entrance enthalpy and steam exit enthalpy calculated from temperature and pressure at the steam entrance and exit for $H_{w,in}$ and $H_{w,out}$.

The reduction in the thermal energy at the gas side (right side) of the equation (1) is calculated by substituting the gas flow rate set as the initial value for $F_w$, and substituting a gas entrance enthalpy calculated from the empirical value $T_{b,in}$ of the boiler entrance gas temperature and gas entrance enthalpy calculated from the empirical value of the gas pressure for $H_{g,in}$. By the substitution processing mentioned-above, a gas exit enthalpy $H_{g,out}$, which is an unknown variable, can be calculated. By conversion of the gas exit enthalpy and the pressure based on the physical characteristics table, the exit gas temperature $T_1$ of the high pressure super heater 12 can be calculated.

Next, the gas exit temperature $T_1$ of the high pressure super heater 12, which is calculated in the above processing is defined as the gas entrance temperature of the high pressure evaporator 13; the thermal balance equation (1) is applied to the high pressure evaporator (S23).

In the case of the high pressure evaporator 13, the entrance enthalpy $H_{w,in}$ at the steam side is applied to entering the high pressure steam drum 18 from the high pressure economizer 14. Under the above conditions, the gas exit temperature $T_2$ of the high pressure evaporator 13 is calculated from the entrance gas temperature $T_1$ of the high pressure evaporator 13, using the same method mentioned above as in the calculation of thermal balance in the high pressure super heater.

Next, the thermal balance equation is applied to the high pressure economizer 14, and the gas entrance temperature $T_3$ is calculated from the gas entrance temperature $T_2$ of the high pressure economizer (S24). The processing in this step is the same as in the processing at the high pressure super heater 12.

Next, the thermal balance equation is applied to the low pressure evaporator 15 (S15); the exit of steam flowing from the low pressure steam dram 17 to low pressure steam turbine and the exit of water flowing from the low pressure steam dram 17 through the pump 20 to the high pressure economizer 14 are objects to be applied. Therefore, the equation (2) that is derived from the equation (1) is used as thermal balance.

$$(F_{w,out1}H_{w,out1} + F_{w,out2}H_{w,out2}) - F_{w,in}H_{w,in} = F_g(H_{g,in} - H_{g,out}) \tag{2}$$

In the equation (2), $F_{w,out1}$ and $H_{w,out1}$ represent an amount (kg/s) of steam flowing from the low pressure steam dram 17 to the low pressure steam turbine and enthalpy (J/kg) respectively; $F_{w,out2}$ and $H_{w,out2}$ represent an amount (kg/s) of steam flowing from the low pressure steam dram 17 to the high pressure economizer 14 and an enthalpy (J/kg), respectively.

Further, $F_{w,in}$ and $H_{w,in}$ represent an amount (kg/s) of water flowing from the low pressure economizer 16 to the low pressure steam dram 17 and an enthalpy (J/kg). The right side is the same as the equation (1); $F_G$ is a gas flow rate (kg/s) and $H_{g,in}$ is an enthalpy (J/kg) of the exit gas and $H_{g,out}$ is an enthalpy (J/kg) of the exit gas; and $H_{g,out}$ is an enthalpy of the exit gas.

The energy increase of steam at the left side is calculated by subtracting energy $F_{w,in}$ and $H_{w,in}$ of water flowing from the low pressure economizer 16 to the low pressure steam dram 17 from the total of $F_{w,out1}$ and $H_{w,out1}$ of steam flowing through the low pressure steam turbine and $F_{w,out2}$ and $H_{w,out2}$ of water flowing through the high pressure economizer.

The equation (3) is applied for the mass balance of steam in the low pressure steam dram 17.

$$F_{w,out1} + F_{w,out2} = F_w, \tag{3}$$

As described above, the thermal balance equation (2) is applied to the low pressure evaporator 15. That is, measured values are substituted for the flow rate $F_w$ at the steam side and enthalpy $H_w$, and the initial value used for calculating the high pressure super heater 12 to high pressure economizer 14 is substituted for gas flow rate $F_g$. Further, enthalpy value converted based on physical characteristics table from $T_3$ calculated at S24 and a gas pressure calculated from the empirical value is substituted for gas entrance enthalpy $H_{w,in}$. As a result, a gas exit enthalpy $H_{w,out}$ of the low pressure evaporator is calculated. When this value is converted by the physical characteristics table, the gas exit temperature T4 of the low pressure evaporator is calculated.

Next, the thermal balance equation shown as equation (1) is applied to the low pressure economizer 16 to calculate the gas exit temperature $T_5$ from the gas entrance temperature $T_4$ of the low pressure economizer (S26). The processing in this step is the same as the processing at the high pressure super heater 12 and the high pressure economizer 14.

According to the above processing, gas temperatures $T_1$ to $T_5$ at the respective heat exchangers in the heat recovery boiler shown in FIG. 1 can be calculated. However, the values are temporary ones for the case where are the initial values are set as the gas flow rates.

In order to find out whether the calculated gas temperature is proper or the gas flow rate set as the initial value is proper, the gas exit temperature T5 of the low pressure economizer 16, calculated at S26 and $T_{b,out}$, which is an empirical value of the boiler exit temperature are compared (S27). In this case, if the temperature difference between the two is a temperature error ε or less, which is determined as a convergent condition in advance, the determined gas flow rate and calculated gas temperatures of the respective heat exchangers are judged as being correct to end the calculation (S28).

On the other hand, the difference is larger than ε, the gas flow rate determined as the initial value is judged as being improper; if $T_5$ is larger than $T_{b,out}$, the gas flow rate $F_g$ is slightly lowered, and if $T_5$ is smaller than $T_{b,out}$, the gas flow rate $F_g$ is slightly increased, thereby to calculate again (S29).

As described above, the convergent calculation is repeated to arrive at an accurate gas flow rate $F_g$ and, at the same time, the gas temperatures $T_1$ to $T_5$ can be calculated. As a result, after the presuming both of the gas flow rate of the whole boiler and the gas temperatures of the respective heat exchangers, which are difficult to be accurately measured, the above procedure can be applied to diagnosis of boiler degradation.

The processing explained above is a method for measuring gas flow rates of gas flowing through the boiler at a high accuracy and for presuming the gas temperatures of the respective heat exchangers.

For the calculation of the thermal transfer performance of the boiler, the gas temperature is necessary, in addition to the gas temperatures; since the boiler has the gas flow passage, which is very wide, and since it is difficult to measure the gas flow rate at high accuracy, there was an error in analysis of thermal transfer in the conventional technology thereby to lower the accuracy of detecting degradation. According to the above processing of the present invention, detection of degradation at high accuracy has become possible.

In the above processing, empirical values of the boiler entrance temperature and boiler exit temperature are used; there should be two or more measuring points. The calculation should not always be done in the direction of gas flow, but can be done in the reverse direction.

In the following, the method of diagnosis of degradation of the respective heat exchangers is explained.

The degradation of heat exchangers means that the heat transfer performance from gas to steam is lower than that of the normal condition. As a typical cause of degradation is such a phenomenon that stain adheres to pipes constituting the heat exchangers. If the phenomenon occurs, steam of high temperature and high pressure cannot be generated with high efficiency; an output of the steam turbine decreases and a electricity efficiency of the C/C plant lowers.

There is a thermal transmission rate, which is a parameter for representing heat transfer performance of the heat exchangers. The thermal balance equation and the thermal transmission rate have the relationship represented by the equations (4a), (4b). This relationship applies for the respective heat exchangers.

$$\begin{cases} Q = F_w \cdot (H_{w,out} - H_{w,in}) = F_g \cdot (H_{g,in} - H_{g,out}) & (4a) \\ Q = K \cdot A \cdot \Delta T & (4b) \end{cases}$$

Q denotes a heat transfer rate (W) from gas to steam. Other, symbols used in the equation (4a) are the same as in the equation (1). In the equation (4b), K is the thermal transmission rate (W/(m$^2$ K), which represents a thermal flow (thermal quantity per unit time) transferred from gas to steam per a unit gas-steam temperature difference (K) per a unit transfer area (m$^2$) A is a transfer area (m$^2$), which represents an area where gas is in contact with steam to transfer heat; in the heat recovery boiler, the contact area is the whole surface area of the pipes constituting the heat exchangers. ΔT is a logarithmic average temperature difference (K) between gas and steam, which is represented by the equation (5).

$$\Delta T = \frac{T_g - T_w}{\ln(T_g / T_w)}$$

In the equation (5), $T_g$ is a representative temperature of gas in the respective heat exchangers, and $T_w$ is the representative temperature of steam.

As shown in the equation (4b), when the thermal transmission rate K, the heat transfer area A and the logarithmic average temperature difference ΔT are multiplied to make a heat transfer amount Q from gas to steam. The heat transfer amount Q is the same value as one calculated by the thermal balance equation in view of static characteristics, if a energy loss caused by heat dissipation to the outside of the boiler is neglected. That is, the thermal quantity difference of gas or the thermal quantity difference of steam may be used.

In the processing shown in FIG. 2, the heat transfer amount Q and temperatures of gas and steam have already been calculated by the thermal balance. That is, if the intermediate temperature between the entrance and the exit is the representative temperature, the gas temperature $T_g$ and the steam temperature $T_w$ are determined, and the logarithmic average temperature difference ΔT can be calculated. Further, the heat transfer area A can be determined by the boiler design information, which is a constant parameter.

Accordingly, it is possible to calculate an empirical value of the thermal transmission rate K from the gas flow rate and the gas temperature determined by the convergent calculation and the process values (temperature/flow rate/pressure) concerning empirical gas pressure and steam, using the equation (4b). The empirical value is a thermal transmission rate determined by a thermal quantity that actually transfers from gas to steam.

As mentioned earlier, since the thermal transmission rate is the thermal transfer performance from gas to steam, which is a parameter representing thermal conductivity, calculation of the thermal transmission rate to monitor the changing tendency enables to detect the degradation of the heat exchangers.

However, the thermal transmission rate is the characteristics parameter that may change depending on temperatures, flow rates and pressures. Since the temperatures, flow rates and pressures of gas/steam of the heat recovery boiler change in accordance with condition of plant operations, the thermal transmission rate changes accordingly. Under these conditions, it is difficult to distinguish whether the change is caused by operation condition of the plant or by degradation of the plant, even if the thermal transmission under monitoring decreases.

Accordingly, it is useful to know the degradation by judging whether the present empirical value is in a normal range or not, by comparing the empirical value of the thermal transmission rate with a theoretical value corresponding to the plant operation conditions. Here, the theoretical value is an expected thermal transmission rate, determined based on design conditions of the boiler, which correspond to temperatures, flow rates and pressures of gas/steam that change under plant operation conditions, when degradation (lowering of performance of thermal transfer) does not progress.

The theoretical value K of thermal transmission rate can be calculated by the equation (6a).

$$\frac{1}{K} = \frac{D_2}{D_1}\frac{1}{h_W} + \frac{D_2 \ln(D_2/D_1)}{2}\frac{1}{\lambda_m} + \frac{1}{h_g(A_f\Phi + A_b)/(A_f + A_b)} \quad (6b)$$

$$A_f + A_b = A$$

Here, $D_1$ and $D_2$ are an inner diameter (m) and outer diameter (m) of the pipes, respectively.

$\lambda m$ is a thermal conductivity (W/(m K)), which is a physical value determined by a kind of material of the pipes used.

$A_f$ and $A_b$ are the surface area (m²) of fins of the pipes and the surface area (m²) of the bottom between the fins, respectively. In order to conduct thermal transfer with high efficiency, pipes constituting the heat exchangers with fins may be used. The A in the equation (4b) is defined by the total surface area of the surface area $A_f$ of fins and the surface area $A_b$ of the bottom between the fins.

φ, called a fin efficiency, is a parameter concerning influence of temperature distribution on thermal conductivity.

$A_f$, $A_b$ and φ are calculated based on the design information such as sizes of pipes with fins, etc. $h_w$ and $h_g$ are thermal transfers (W/(m² K)) of gas and steam, respectively, which are calculated by the following equation below.

The thermal transfer hw of steam is calculated by the equation (7).

$$Nu = 0.023\, Re^{0.8} Pr^{0.4}$$

$$h_W = \frac{Nu\,\lambda}{\text{Effective}}$$

The equation (7a) represents relationship among the Nusselt number Nu, Reynolds number Re and Prandtl number Pr (all dimensionless parameters), which is held when steam flows through the pipes. If Nu is calculated by this equation, the, thermal transfer $h_w$ is calculated by the equation (7b).

$\lambda$ is a thermal transfer rate (W/(m K)), which is calculated by the temperature and pressures. The effective diameter (m) is the inner diameter $D_1$ of the pipes.

The equation for calculating Re in the equation (7a) is shown in the equation (8) and the equation for calculating Pr is shown in the equation (9).

$$Re\, \frac{\text{Flow rate effective diameter}}{\text{Dynamic viscosity coefficient}}$$

$$Pr\, \frac{\text{Viscosity coefficient specific heat}}{\text{thermal conductivity rate}}$$

When Re shown in the equation (8) is calculated, the flow velocity (m/s) is calculated by dividing the steam flow rate (kg/s) by the steam density (kg/cm³) and the surface area (m²) of flow passages. The density is determined from the physical characteristics table by temperature and pressure of steam, and the flow area is calculated from the inner diameter. The effective diameter (m) is the inner diameter $D_1$ of the pipes. The dynamic viscosity coefficient (m²/s) is determined based on the physical characteristics table by temperature and pressure.

When Pr set forth in the equation (9) is calculated, the viscosity coefficient (Pa s), specific heat (J/kg K) and thermal conductivity (W/(m K)) are determined by temperature and pressure of steam, based on physical characteristics table.

The thermal transfer rate Hw of steam is calculated from temperature/flow rate/pressure at the steam side and a structure of pipes used in the heat exchangers.

The thermal transfer $H_g$ (W/(m² K)) is shown in the equation (10).

$$h_g = h_{g,c} + h_{g,r} \quad (10)$$

In the equation (10), $h_{g,c}$ is a convention thermal transfer rate (W/(m² K)) and $h_{g,r}$ is a radiation thermal transfer rate (W/(m² K)). The thermal transfer rate of gas is obtained by calculating thermal transfers by convention and radiation and they are totalizes.

$$Nu = 0.27\, Re^{0.63} Pr^{0.36}(Pr/Pr')^{0.25}$$

$$h_{g,c} = \frac{Nu\,\lambda_g}{\text{Effective diameter}}$$

The equation (11)a shows relationship among Nu, Re and Pr, applied for the case where gas passes through a heat exchanger having plural pipes. Here, Pr' is Prandtl number in the vicinity of pipe walls. If Nu is determined by the equation (11)a, convection thermal transfer rate $h_{g,c}$ is calculated by the equation (11b) in the same manner as in the thermal transfer rate of steam. Here, $\lambda g$ represents thermal transfer rate (W/(m K)) of gas.

In the equation (11a), the definitions of Re and Pr are the same as the thermal transmission at the steam side, as expressed by the equations (8) and (9). In the calculation of the flow rate of Re, an area where gas flows through the narrowest gaps between the pipes is used as the flow area. This is calculated from design information such as a size of a gas tower of the boiler, the size of pipes, distances between the pipes, etc.

The effective diameter is calculated from the design information. Parameters necessary for calculating Re and Pr are acquired from the physical characteristics table if gas temperatures and pressure are known. When the Prandtl number Pr' in the vicinity of the pipe surface is calculated, steam temperatures are used instead of gas temperatures.

FIG. 7 shows an example of design information data stored in a database. The table comprises of design items including the gas tower length in vertical direction, gas tower length in lateral direction, the number of pipes in a row, the number of pipes in a column, an outer diameter of pipes, an inner diameter of pipes, a height of fins, a thickness of fins, etc. The table also contains names of components constituting the boiler.

As described above, the convention thermal transfer rate $h_{g,c}$ is calculated from temperature/flow rate/pressure of gas (part of them is of steam) and the structure of pipes used in the heat exchangers.

Further, the radiation thermal transfer rate $h_{g,r}$ is expressed by the equation (12b).

$$\varepsilon = a_1\left(\frac{P_{CO2}L}{T_g}\right)^{a_3} + a_2\left(\frac{P_{H2O}L}{T_g}\right)^{a_4} \quad (12b)$$

$$h_{g,r} = \varepsilon(b_1 T_g^3 + b_2 T_g^2 + b_3 T_g)$$

In this embodiment, radiation only by carbon dioxide and water is taken into consideration as thermal transfer by radiation. $\varepsilon$ shown in the equation (12a) is a radiation rate (dimensionless) of gaseous mass. L is an effective thickness (m) of the gaseous mass, which defines the distance between the pipes. $T_g$ is a gas temperature.

P—$CO_2$ and P—$H_2O$ are partial pressures (kgf/cm$^2$) of $CO_2$ and $H_2O$, respectively. A gas composition after combustion is calculated, based upon a ratio of an air flow rate to a fuel flow rate, and the partial pressures are calculated using the composition.

As shown in the equation (12a), an approximate value for calculating the above-mentioned four parameters is given in advance. That is, $a_1$ to $a_4$ are fitting parameters in the approximate equation.

The radiation thermal transfer rate $h_{g,r}$ is, as shown in the equation (12b), calculated by multiplying a correction by gas temperature $T_g$ with the radiation rate $\epsilon$. $b_1$ to $b_3$ are fitting parameters for the correction function.

The radiation thermal transfer rate $h_{g,r}$ at the gas side is calculated, based on temperature/flow rate/pressure of gas (part is a gas turbine air flow amount and a fuel flow rate) and the structure of the pipes for the heat exchangers.

In the above-described processing, the theoretical value of thermal transmission rate K is calculated by using the equation (6), based on the design information including status amounts (flow rates, temperatures, pressures) of gas/steam and structures of pipes.

Although the equations (6a and (6b) are theoretical equations on a circular pipe, the form of theoretical equations may be adapted to the shape of the pipes.

Figure 3:
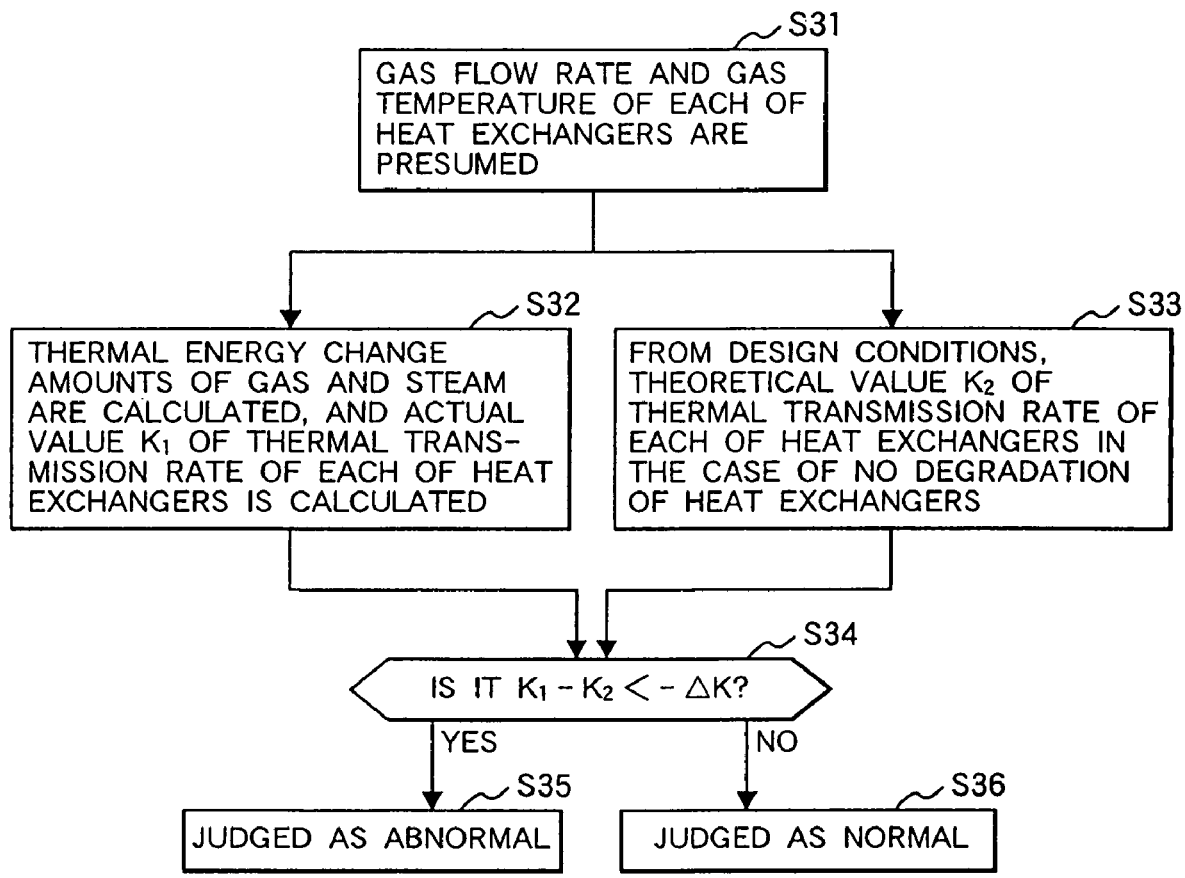
FIG. 3 is a flow of judging boiler degradation.

FIG. 3 shows a flow of diagnosis of a boiler degradation by an empirical value and a theoretical value. At first, the presumption processing for the gas flow rate, which is disclosed in FIG. 2, is conducted so that the gas temperature before and after the respective heat exchangers is presumed (S31). By this processing and the empirical value, the status amounts (flow rates, temperatures, pressures) of steam and gas in the respective heat exchangers are determined. Then, the empirical value of the thermal transmission rate is calculated by the equation (4b) (S32).

At the same time, the theoretical value $K_2$ of the thermal transmission rate is calculated by the equation (6a) (S33). Then, the calculated empirical value $K_1$ and the calculated theoretical value of the thermal transmission rate are compared with each other (S34); when the empirical value is smaller than the theoretical value by the predetermined error $\Delta K$ of the thermal transmission rate, the status is judged as abnormal (S35). The statuses other than the above are judged as normal (S36).

The diagnosis processing shown in FIG. 3 is carried out repeatedly with a predetermined time interval. S32 and S33 are conducted in parallel with, but may be conducted separately. The order of S32 and S33 is not limited.

As discussed above, the theoretical value and empirical value of the thermal transmission rate are calculated using the gas flow amount and the gas temperature presumed in the presumption processing and measured gas pressure and flow rates, temperatures and pressures at the steam side (water), and they are compared to detect degradation. Accordingly, the appropriateness of the empirical value of the thermal transmission rate can be evaluated, using the theoretical value of the thermal transmission rate, which changes in accordance with the plant operation conditions. Accordingly, the diagnosis of boiler degradation can be carried out with a high accuracy.

The feature of the equations (6a), (6b) for calculating the theoretical value are that they have $h_w$ and $h_g$, which take into consideration thermal conductivity of steam or gas, and that it has thermal conductivity $\lambda_m$ of the pipes. By suing these data as a database, thermal transmission rates that change in accordance with the plant operation conditions can be calculated to obtain accurate values.

Figure 4:
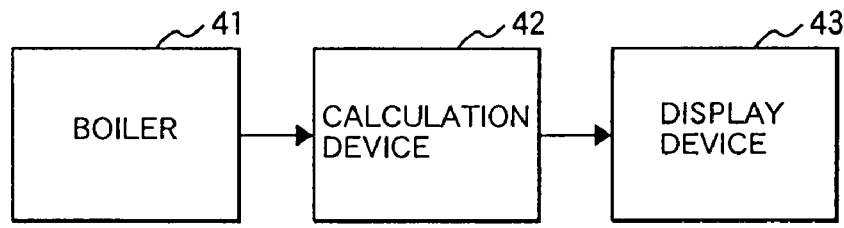
FIG. 4 is a system constitution of a boiler monitoring and diagnosis.

FIG. 4 shows an example of an arrangement for carrying out the diagnosis processing. Numeral 41 denotes a heat recovery boiler to which the diagnosis of the present invention is applied. Numeral 42 a calculation section for carrying out the diagnosis processing by taking empirical values of the heat recovery boiler. Numeral 43 a display device for displaying the diagnosis result conducted in the calculation section.

Figure 5:
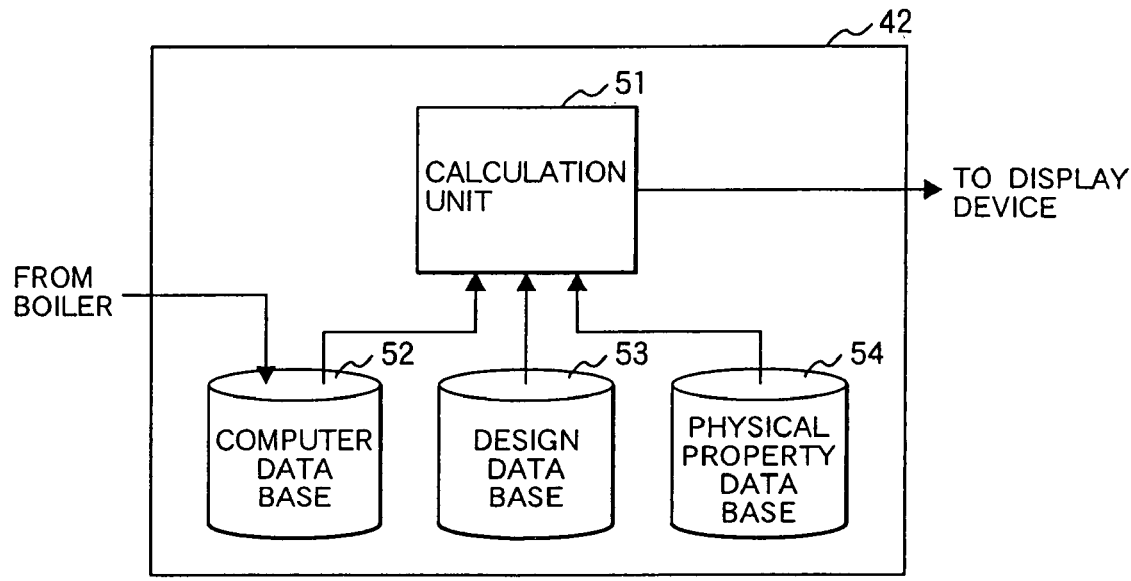
FIG. 5 is a constitution of a calculating section.

FIG. 5 shows a block diagram of the inner structure of the calculating device 42. The measured values concerning steam/gas are stored in the empirical database 52. The calculation device 51 periodically reads the measured values from the measured database, and also reads design information on the pipes of the respective heat exchangers including gas tower dimensions, outer/inner diameter of pipes, fin size, distances between pipes, materials, etc from the design database 54. Then, the diagnosis of the boiler is conducted.

Physical characteristics of gas and steam necessary for the processing are stored in the characteristics value database 54. The calculation section 51 reads the physical data on demands to conduct calculation. The databases 52, 53, 54 may be installed outside the calculation device.

FIG. 7 shows an example of data structure stored in the design database 53. The design database stores the design data necessary for calculating the theoretical value of the thermal transmission rate.

The calculation section 51 outputs the result to the display device 43.

Figure 6:
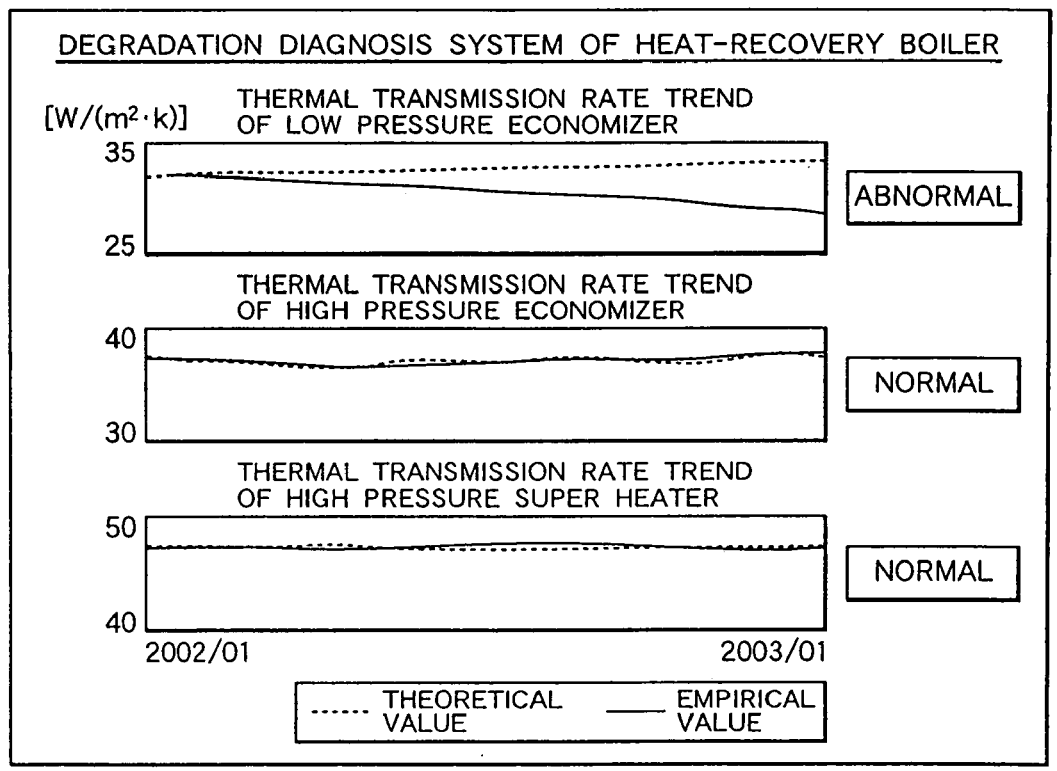
FIG. 6 is an example of a display of a boiler monitoring and diagnosis system.

FIG. 6 is an example of display of the diagnosis result on the display device 53. In FIG. 6, there are displayed trends of the theoretical values and empirical values of the thermal transmission rates calculated by the above-mentioned processing.

If the theoretical values and the empirical values are almost the same, the boiler is the normal; if there is the difference between them, the boiler is abnormal. In the example shown in the figure, the difference between the theoretical value and the empirical value of the low pressure economizer becomes larger as the time goes by, which is judged as abnormal. Other heat exchangers exhibit almost the same values, which are judged as normal.

As explained above, by displaying the theoretical values and the empirical values of the thermal transmission rates with respect to the heat exchangers, it is possible to easily understand which heat exchanger constituting the boiler decreases its thermal conductivity performance and understand quantitatively the degree of degradation of the plant. According to the information, it is possible to know the abnormality of the boiler at an early stage and to know quantitatively the degree of progress of degradation. As a result, it is possible to adopt an operation support for an operation of the plant as a countermeasure to the abnormality of the boiler. Further, it is possible to decide which heat exchanger should be repaired and the timing of repair of the heat exchangers.

The processing content in the calculation section is stored as a degradation diagnosis program in a recording medium such as portable discs or hard disc drive apparatuses readable with a computer.

The present invention may be applied to plants for supplying heat, in addition to power plants.

What is claimed is:
1. A diagnosis method for boiler degradation, comprising:
calculating a first thermal transmission rate from a difference in thermal quantity of gas or steam between an entrance and exit of a heat exchanger with respect to at least one heat exchanger constituting the boiler;

calculating a second thermal transmission rate based upon a thermal conductivity rate of pipes and thermal conductivity transfer rate of steam and gas of the heat exchanger;

comparing the first and second thermal transmission rates; and carrying out diagnosis of the progress of degradation, wherein the diagnosis is displayed on a display device, wherein the boiler is a heat recovery boiler for recovering heat from a gas turbine.

2. A boiler degradation diagnosis system comprising:

a measuring device for steam and gas taken from a boiler;

a database for storing design information of heat exchangers constituting the boiler and physical property values of steam and gas;

a calculation device for calculating a first thermal transmission rate based on thermal difference of gas or steam at an exit and entrance of heat exchangers of pipes and for calculating a second thermal transmission rates based upon thermal conductivity rate of pipes, and thermal transfer rates of steam and gas, stored in the database; and a display device for displaying a change of tendency in the first and second thermal transmission rates with respect to the same heat exchanger, wherein the boiler is a heat recovery boiler for recovering heat from a gas turbine.

3. A recording medium for a boiler degradation diagnosis program for causing a computer to calculate a first thermal transmission rates from thermal quantity difference in steam or gas between an exit and entrance of at least one heat exchanger, further to calculate a second thermal transmission rates based upon thermal conductivity of pipes and thermal transfer rates of steam and gas with respect to the same heat exchanger, to compare the first and second thermal transmission rates, to diagnose progress of degradation, and to display a diagnosis result, wherein the boiler is a heat recovery boiler for recovering heat from a gas turbine.

* * * * *

UNITED STATES PATENT AND TRADEMARK OFFICE
CERTIFICATE OF CORRECTION

| | | |
|---|---|---|
| PATENT NO. | : 7,464,002 B2 | Page 1 of 1 |
| APPLICATION NO. | : 11/826619 | |
| DATED | : December 9, 2008 | |
| INVENTOR(S) | : Yoshiharu Hayashi | |

It is certified that error appears in the above-identified patent and that said Letters Patent is hereby corrected as shown below:

On the cover of the patent, please insert --Foreign Application Priority Data June 28, 2004 (JP) 2004-189095--.

Signed and Sealed this

Fourteenth Day of April, 2009

JOHN DOLL
*Acting Director of the United States Patent and Trademark Office*